United States Patent
Dear

[15] 3,695,497
[45] Oct. 3, 1972

[54] METHOD OF SEVERING GLASS
[72] Inventor: Terrence A. Dear, Newark, Del.
[73] Assignee: PPG Industries, Inc., Pittsburgh, Pa.
[22] Filed: Aug. 26, 1970
[21] Appl. No.: 66,940

Related U.S. Application Data
[63] Continuation-in-part of Ser. No. 708,952, Feb. 28, 1968, abandoned.

[52] U.S. Cl. ................225/2, 225/93.5, 225/96.5, 219/347
[51] Int. Cl. .................................................B26f 3/00
[58] Field of Search.........................225/1–5, 93.5, 225/96.5; 65/97, 112; 219/347–349, 121 L

[56] References Cited

UNITED STATES PATENTS

| | | | |
|---|---|---|---|
| 1,720,883 | 7/1929 | Campbell et al. | 225/93.5 |
| 1,777,644 | 10/1930 | Hitner | 225/93.5 |
| 1,973,546 | 9/1934 | Spinasse | 65/97 |
| 3,344,968 | 10/1967 | Kovacik et al. | 225/96.5 X |
| 3,453,097 | 7/1969 | Häfner | 65/112 |
| 3,112,850 | 12/1963 | Garibotti | 225/2 |

FOREIGN PATENTS OR APPLICATIONS
1,244,346   7/1967   Germany................219/121 L

OTHER PUBLICATIONS
Osial, T. A. Industrial Laser Applications In Instruments & Control Systems, October, 1967, pp. 101–104

*Primary Examiner*—James M. Meister
*Attorney*—Chisholm and Spencer

[57] ABSTRACT

This invention relates to a non-contact thermal-score, mechanical snap method and apparatus for reliably cutting glass yielding pieces of glass having a high edge strength. A delineated infrared source is positioned at one focus of an elliptical reflector means, thereby causing its energy to be concentrated at a focus locus that is caused to coincide with one surface of the piece of glass to be cut along an intended line of fracture, creating a thermal score or heat path. The piece of glass is then severed by applying a bending moment around the heat path.

27 Claims, 8 Drawing Figures

3,695,497
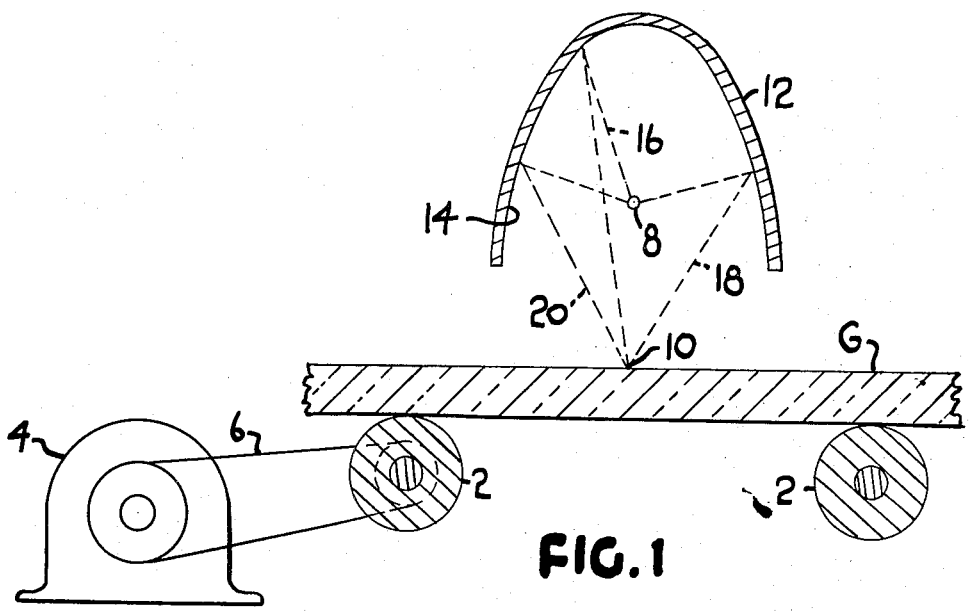
FIG.1
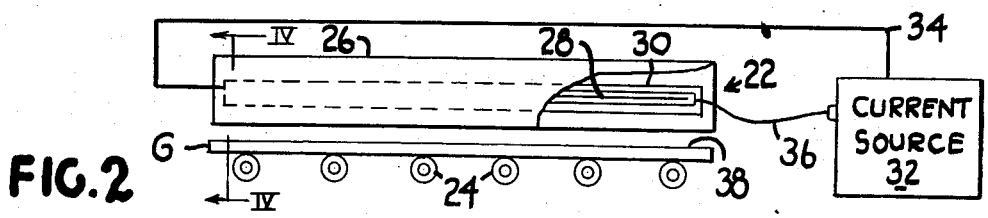
FIG.2
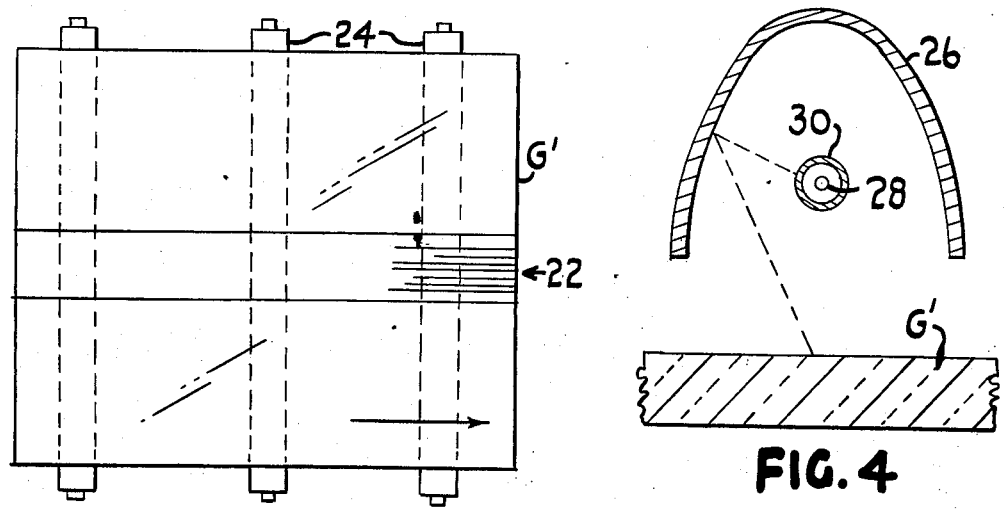
FIG.3
FIG.4
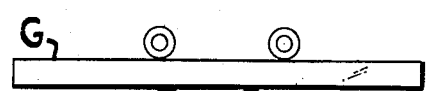
FIG.5
INVENTOR
TERRENCE A. DEAR
BY Chisholm and Spencer
ATTORNEYS

INVENTOR
TERRENCE A. DEAR

BY
ATTORNEYS

METHOD OF SEVERING GLASS

CROSS REFERENCE TO RELATED APPLICATION

This application is a continuation-in-part of my copending U.S. application Ser. No. 708,952, filed Feb. 28, 1968, now abandoned.

BACKGROUND OF THE INVENTION

1. Field of the Invention

This invention relates to a method of severing glass sheets by thermally inducing a temporary stress in a piece of glass.

2. Description of the Prior Art

The most pertinent prior art of which I am aware comprises Campbell et al., U.S. Pat. No. 1,720,883; Hitner, U.S. Pat. No. 1,777,644; Spinasse, U.S. Pat. No. 1,973,546; Kovacik et al., U.S. Pat. No. 3,344,968; and Hafner, U.S. Pat. No. 3,453,097.

The Campbell et al. patent discloses, for example, the severing of glass in accordance with a method comprising "bringing a hot object or objects or elements, heated electrically or otherwise, into contact with or into close proximity of the glass." It discloses, moreover, that: "In order to quickly initiate the severing action, a nick or fault or other weakened portion may be formed by the apparatus at a point on the glass at the line of cleavage where the severage action is to start."

The Hitner patent discloses, for example, "An improved apparatus adapted to prevent the somewhat irregular line of fracture which has hitherto been characteristic of the severing of glass by the use of an electrically heated wire or ribbon." This patent uses an electrically heated wire for the non-contact severing of glass, but it teaches "providing means for giving a distribution of heat over a substantial area of glass on each side of the ribbon or wire," stating that "as a result, the line of fracture is smooth and regular, approximating in these particulars the line of fracture secured by scoring the glass with a diamond or wheel."

The Spinasse patent discloses, for example, "A tubular portion of metal or other suitable refractory material adapted to present a heating surface in close contact with or in close proximity to the body of the drawing sheet near the region where the same is to be cut to remove the border." It further states: "It will be obvious, therefore, that as a sheet of glass is drawn past the heating element the border of the glass is heated in a path parallel to and near the edge of the sheets so that if the glass could be cut or checked by means of a cold checking tool beyond the heated path, shown by the broken line in FIG. 2, the border can be easily removed without fracturing the body of the sheet." The patent further teaches that the "temperature of the heating element can be varied according to the thickness of the glass or the speed at which it is drawn past the heater but as a rule a cherry-red heat yields good results for the average sheet at the average speed of drawing."

Kovacik et al. discloses, for example, "A plurality of spaced score lines 20 to 23 are made on one surface of the sheet inwardly of each longitudinal edge and thereafter the portions A, B and C are respectively or successively removed to redistribute the stresses within the glass sheet. The final cut is then made by locating the gauging bar a distance of one-half the width of the heating apparatus from the predetermined line of cut 23 and thereafter aligning the heating apparatus against one surface of the gauging bar to locate the electrical resistance element on the score line 23. Heat is supplied a sufficient period of time to allow the cut to run the entire length of the sheet."

The Hafner patent discloses a method of cutting glass "wherein the glass sheet is moved continuously past a continuous laser beam which is focused upon the glass sheet. The laser and absorptive characteristics and parameters are selected but the glass absorbs the laser energy and converts it into sufficient heat to enable separation of the sheet into pieces along the line swept by the laser beam."

SUMMARY OF THE INVENTION

In accordance with this invention, a piece of glass is severed by:

a. inducing an artificial defect in an edge area of the sheet;

b. exposing the sheet to a line of energy application of a thermal energy source coincident with said artificial defect; and c. applying a bending moment about the line of energy application of the thermal energy source to sever the sheet along said line.

The artificial defect is normally an edge nick (fracture initiation score) about ¼ inch (6.3 millimeters) to ½ inch (12.6 millimeters) that is applied to the glass by an operator using a hand tool. It is important to note that this edge nick can be placed on the glass either before or after the sheet is exposed to the thermal-energy source, as long as the nick is placed on the glass prior to the application of the bending moment.

The method of the invention described can be performed on plate glass, float glass, sheet glass and low expansion glass, with edges being produced, in each instance, that are straight, smooth, perpendicular and strong.

Non-contact thermal scoring is conducted by using a focused source of infrared energy having suitable power and delineation characteristics. The term "thermal score," as used in this application, does not mean a scratch or groove in the glass surface, but rather a condition brought about by heat wherein stresses are created that extend from one surface to an opposite surface of a sheet of glass. This concept is similar to the one disclosed in my copending U.S. Application Ser. No. 66,941 except that the method of the present application does not require the creation of a tensile stress of 1,000 pounds per square inch (725 grams per square millimeters). The method yields reliably cut pieces of glass having edges of high quality, particularly in regard to their strength. Though possibly of some use with glass as thin as 0.04 inch (1 millimeter) in thickness, the method of the invention is of particular usefulness in the cutting of thick flat glass, such as over 0.25 inch (6.35 millimeters) in thickness. While the non-contact thermal-scoring, mechanical snapping method of severing glass sheets has considerable commercial advantages with reference to sheets of glass having a thickness of 0.25 inch (6.35 millimeters) or more, the invention may be used with respect to glass sheets having a thickness of 0.04 inch (1 millimeter) to 2 inches (51 millimeters) and possibly thicker.

The present invention is of great importance in connection with the severing of sheets that are greater than 0.25 inch (6.35 millimeters) in thickness because when mechanical scoring means have been used in connection with the above, there has hitherto been difficulty in obtaining a cut edge of satisfactory appearance, high edge strength, and other desirable characteristics. It has been particularly difficult to obtain, in cutting a piece of glass that thick, an edge that is suitable for further use without a further grinding or polishing operation. Moreover, the strength of the cut edge produced by prior art methods such as hand scoring and snapping usually does not exceed 3,900 pounds per square inch (2,900 grams per square millimeter) and is frequently considerably less than that, whereas it is frequently desired that, especially without such grinding and polishing, the cut edges exhibit better edge-strength values. The edges produced by the non-contact thermal score-mechanical snap method as taught herein have a pristine appearance and high strength.

The ability of a sheet of glass to be severed by the non-contact thermal-score, mechanical snap method of the present invention is dependent in large measure upon the ability of the glass to absorb suitable infrared radiation selectively through its thickness. In this regard, much depends upon the ability of the glass to absorb electromagnetic radiation in the range of the near infrared, particularly with a peak wave length of about 8,500 to 11,500 Angstroms (0.85 to 1.15 microns). This, in turn, is dependent to some extent upon the transition-element content of the glass involved. The transition elements are iron, cobalt, and nickel, and it is usual for one of these elements, especially iron, to be present in glass to at least some small extent, on the order of about 0.12 percent $Fe_2O_3$ in clear plate glass, about 0.147 percent $Fe_2O_3$ in sheet glass and about 0.09 percent $Fe_2O_3$ in clear float glass. The use, in accordance with the present invention, of a thermal source that emits substantial quantities of electromagnetic radiation at a somewhat higher wave length, in the event that the glass to be severed by the instant invention is noticeably free of transition elements, is not to be ruled out. In most of the glass of commerce, however, the element iron is present as aforesaid in about the amount mentioned, and this tends to make a piece of glass produced in accordance with methods now commercially utilized amenable to the thermal-scoring, mechanical snapping process wherein the electromagnetic radiation has a wave length as indicated above.

In accordance with the present invention, several things are required. First, it is required that the source used be one that has satisfactory delineation, considering as another very important factor the potency of the thermal source employed. If the thermal source is a spot source, the source should not be more than 0.25 inch (6.35 millimeters) in diameter. With a source larger than that, difficulty is experienced in attempting to concentrate or focus upon a particular area in a surface of the glass. If the source is less delineated, it must be stronger in order to produce the thermal stress necessary to create the thermal path on the surface of the glass.

It is essential, in accordance with the present invention, not only that the source used be so delineated as indicated above, but also that there be provided a suitable elliptical heat-reflecting means in operative association with the thermal source, preferably but not necessarily an elliptical heat-reflecting means. When the reflector is elliptical, the thermal source is to be placed at one of the foci of an ellipse, such that the other focus of the ellipse forms a focus locus that is substantially coincident with a surface of the sheet that is to be cut and substantially coincident with the line of cut that is to be effected thereon. Even a relatively minor inaccuracy in the alignment of the focus locus with the surface of the glass sheet to be cut may have relatively serious consequences as respects the efficiency of the cutting operation. For example, taking the cutting of a piece of glass 0.12 inch (3 millimeters) in thickness, a misalignment in the focus locus of more than 0.03 inch (0.75 millimeter) in the positioning of the sheet with respect to the focus locus may result in a decrease, in the amount of thermal energy absorbed by the glass sheet of at least as much as 20 or 25 percent.

If the thermal source is a spot heater, the focus locus is substantially a point or a small sphere. On the other hand, if the thermal source is a line heater, the focus locus comprises a cylindrical line.

It is considered to be within the scope of the present invention to provide means whereby a relative motion is effected between the glass that is to be cut and the thermal source. On the other hand, the present invention can also be used while both the glass and the thermal source remain completely stationary.

In making a cut by thermal means alone, it is important that the amount of radiation, i.e., incident upon the zone containing the intended line of fracture propagation be such as to generate in a glass a stress of at least 1,000 pounds per square inch (725 grams per square millimeter), this being the stress that is required to cause fracture of a glass along the intended line of cut. This is discussed in my copending U.S. Application Ser. No. 66,941. In the thermal-score, mechanical-snap process of the instant invention, it is not necessary to produce a stress of such magnitude. However, as discussed in the above mentioned application, any method that causes melting of the glass at the top surface yields lower edge-strength values than are obtained when the present invention is practiced.

The thermal-scoring step of the present invention is such that electromagnetic radiation should be supplied to the piece of glass that is to be severed under such conditions that the piece absorbs the energy at a rate of at least about 66 watts per square inch (0.1 watts per square millimeter) in the zone of the intended cut. Usually, the energy flux in the zone of the intended score is at least 153 watts per square inch (0.24 watts per square millimeter), and it sometimes is on the order of 453 watts per square inch (0.70 watts per square millimeter) or higher. In any case, it is not so high as to cause incipient melting of the glass (which detracts from the edge strength and quality of the piece). The level of energy to be used is dependent upon a number of factors, including the thickness of the glass, the iron or other transition-metal content of the glass, and the nature of the process employed, i.e., whether the piece to be severed is stationary or moving while thermally scored. If the piece to be severed is stationary while scored, the level of thermal energy supplied to the glass will have an influence upon the amount of time required to cause the thermal score to develop. If the glass to be severed is moving while scored, the level of thermal energy supplied to the glass has an influence upon the line speed that is to be used in the non-contact thermal-scoring operation.

Distinct advantages are obtained by conducting the cutting in the manner herein taught. In general, when the cutting is done in the manner taught in accordance with this invention, the edge strength of the cut piece is about at least twice that of a piece cut in accordance with prior-art method such as hand-scoring and snapping. The increase in edge strength is not merely of academic interest, since the edge strength is related to the observed incidence of breakage during any subsequent handling of the edge-cut sheet of glass involved.

DESCRIPTION OF THE DRAWINGS

A complete understanding of the invention may be obtained from the foregoing and following description thereof taken in conjunction with the appended drawings which are diagrammatic and not to scale and in which:

FIG. 1 is a schematic elevation view of equipment used in practicing the method of the instant invention, using a spot-heater source;

FIG. 2 is a schematic elevation view indicating the practice of the instant invention with the use of a line-heater source with the second part partly broken away for a better understanding in showing of the instant invention;

FIG. 3 is a plan view of the equipment shown in FIG. 2;

FIG. 4 is a partial sectional view taken on line IV—IV of FIG. 2;

FIG. 5 is a schematic elevation view indicating the practice of applying a bending moment at the thermal score;

DESCRIPTION OF THE PREFERRED EMBODIMENT

Figures 6, 8:
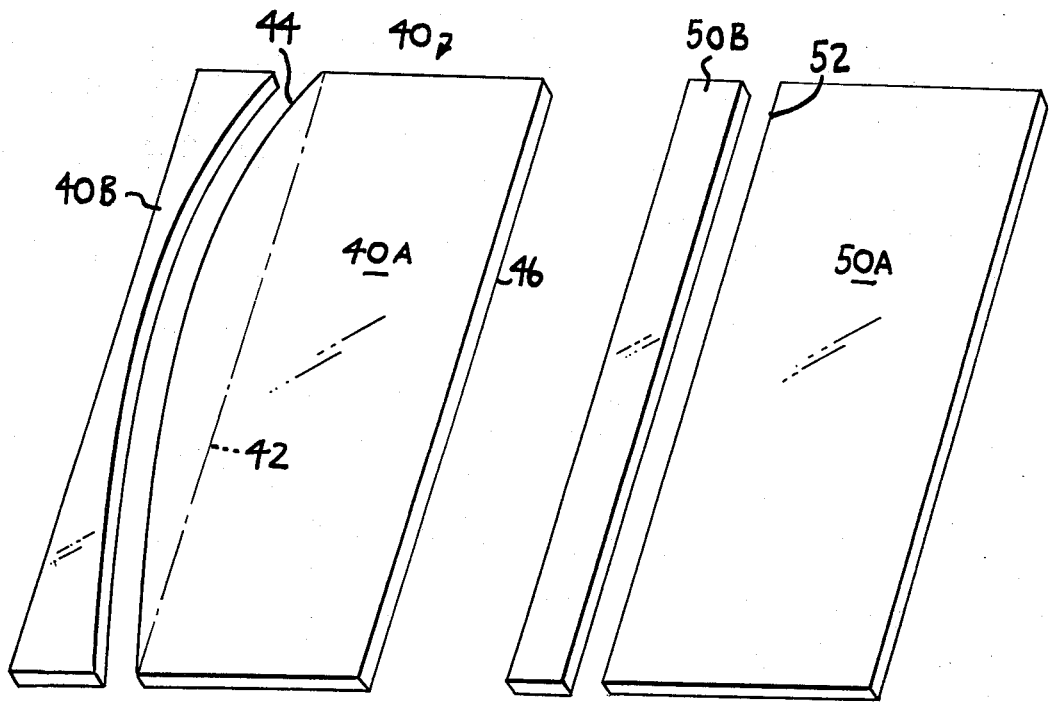
FIG. 6 is a perspective view of a piece of glass and a trim removed therefrom, said piece of glass having a "-banana edge"
FIG. 8 is a perspective view of the second piece of glass after it has been severed.

Referring to FIG. 1, there is shown a piece of glass G that is being moved by means of rolls 2 driven by a motor 4, to which the rolls are operatively connected as indicated at 6. The drawing shows schematically a spot source 8 of thermal energy, preferably one that has a substantial output of radiation in the range of 8,500 to 11,500 Angstroms wave length, and necessarily one that is capable of producing at the spot or locus 10 electromagnetic thermal radiations such that the heat applied is great enough to produce a stress in tension within the thickness of the glass. In thermal cutting, as described in my copending U.S. Application Ser. No. 66,941, it is necessary to create a tensional stress of 1,000 pounds per square inch (725 grams per millimeter) for a thermal fracture to occur. In the case of a thermal score, the stress is not that high.

Source 8 may be, for example, a spot source having a diameter of at most 0.25 inch (6.35 millimeters) being a wire or filament supplied with a suitable electrical power by means not shown. It may be considered as comprising a line heater such as a helical coil 0.05 to 0.07 inch (1.27 to 1.78 millimeters) in diameter made of tungsten wire about 0.006 inch (0.152 millimeter) in diameter and encased in a quartz tube filled with argon or other inert gas, this line heater being similarly supplied with a suitable quantity of suitable electrical power. In any event, the source 8 is such as to provide at the focus locus 10 a suitably delineated image not wider than approximately 0.25 inch (6.35 millimeters) for a spot heater and in the case of a line heater, about half of that.

As a preferred feature of the invention, there is provided an elliptically shaped hood 12 that has interiorly thereof, a highly polished and reflective surface 14. As can be seen from FIG. 1, the surface 14 is such that radiation emanating from the source 8, as indicated by lines 16, 18 and 20, is reflected and focused at the focus locus 10. To obtain this result, it is essential that source 8 be located substantially at one of the foci of the ellipse that is generated by completing the surface 14, with the focus locus 10 forming the other focus of said ellipse. In the event that the source 8 is considered as constituting only a spot, the surface 14 constitutes a frustrum of an ellipsoid of appropriate shape. If the source 8 comprises a line, the shape of the reflecting surface 14 is such that in proceeding along that line and taking any of the planes passing through that line and perpendicular to it, the intersection of that plane with the surface 14 is such as to define an ellipse having one focus at 8 and another focus at 10, with the focus at 10 being aligned with the surface of the sheet of glass G to be cut.

When thermal scoring is done upon a moving piece of glass substantially in accordance with the diagram explained above, there is a certain maximum speed of traverse at which the glass G may be moved. This maximum speed of traverse is dependent upon the thickness of the glass, the transition-element content of the glass and the flux density of the source 8. The diameter of the filament of the source 8 controls the flux density, since a reflector cannot produce at a focus an image smaller than the diameter of the filament. Using a power of 566 watts per lineal inch (223 watts per lineal centimeter), maximum scan speeds have been found to be about: 340 inches per minute (864 centimeters per minute) for 7/32 inch (0.55 centimeter); 370 inches per minute (940 centimeters per minute) for 3/16 inch (0.48 centimeter); and 450 inches per minute (1,143 centimeters per minute) for 1/8 inch (0.32 centimeter).

Referring now to FIGS. 2–4, there is shown another embodiment of the invention in accordance with which a piece of glass G' is subjected to the action of a line heater, indicated generally at 22. The glass G' is supported on suitable members 24 and there is positioned above it a line heater 22 comprising a shield or reflector 26 that is of elliptical shape, as generally indicated hereinabove, within the shield 26 in a line substantially coincident with an upper one of the foci of the family of ellipses determined by the intersection between the interior surface of the reflector 26 and the family of planes, each of them perpendicular to the intended line of cut, is a suitable thermal source. This thermal source may be a filament 28 of tungsten wire 0.006 inch (0.152 millimeter) in diameter wound in a coil of 0.063 inch (1.589 millimeters) in diameter and encased in an envelope 30 of quartz or the like material that is substantially transparent to the infrared radiation emanating from the filament, the envelope 30 being filled with a suitable inert gas such as argon. The filament 28 is connected at its ends to a current source 32 by means of wires 34 and 36. The geometry of the arrangement of FIGS. 2–4 is such that the intended line of cut in the glass G' intersects with the upper surface 38 of the glass G' in a line that is at the other one of the foci of the family of ellipses mentioned above, the one other than the family of foci occupied by the filament 28.

The spacing of the foci is determined by the shape of the ellipse selected, and it is ordinarily such that the foci are about 2 to 4 inches or more (about 50 to 100 millimeters) apart. Achieving accurate focusing upon the upper surface of the glass G' along the intended line of cut is important, the allowable deviation being on the order of 0.06 inch (1.6 millimeters). If desired or necessary, means (not shown) are provided to adjust the distance between the source and the top surface of the glass, particularly if means are not provided for permitting the assembly containing the source and reflector to rest upon the top surface of the glass. If such means are provided, i.e., legs of suitable length, it will not matter if the thickness of the glass to be cut varies somewhat, since with the use of legs of suitable length, proper alignment of the focus locus with the line on the top surface of the glass corresponding to the intended line of cut will be assured, regardless of variations and the thickness of the glass to be cut.

The amount of power to be used is dependent upon factors such as the thickness of the glass to be cut, the amount of time to be allowed for the completion of a satisfactory thermal score, and whether or not there is to be used an edge nick. Under static conditions, cutting a slab of glass that is supported symmetrically with respect to the line of cut, and using a source such that the power radiated to the focus locus is 100 watts per lineal inch (39.4 watts per lineal centimeter), using an edge nick, the time required for the completion of a satisfactory thermal score varies in accordance with the thicknesses of the glass as follows: For glass ¾ inch (18 millimeters) thick, 15 seconds; for ½ inch (12.7 millimeters) thick, 12 seconds; for ⅜ inch (10.5 millimeters) thick, 8 seconds; for ¼ inch (6.35 millimeters) thick, 6 seconds; and for ⅛ inch (3.18 millimeters) thick, 4 seconds. For the power of 200 watts per lineal inch (78.8 watts per lineal centimeter), the score times decrease to: 10 seconds for ¾ inch glass; 5 seconds for ½ inch glass; 4 seconds for ⅜ inch glass; 3 seconds for ¼ inch glass; and 2 seconds for ⅛ inch glass. At higher levels of flux density (power per unit area of energy concentrated at the incident focus), less time is required.

Results similar to those indicated above may be obtained by using as a source a lamp having a lighted length of 25 inches (635 millimeters) and a rated voltage of 600 volts, operated at a rated current of 8.33 amps. When the above conditions are used, it is advisable that the reflector 22 be water cooled, e.g., with the use of a flow of 115.5 cubic inches (1.892 liters) per minute. The same lamp may be operated at above its rated power, for example, when operated at 1,200 volts, a similar lamp may develop 14.2 kilowatts of power and produce at the focus a heat flux of 436 watts per lineal inch (172 watts per lineal centimeter). As the voltage applied to the filament increases, the frequency of its emitted infrared energy shifts to a somewhat shorter wave length, i.e., from a peak of 11,000 Angstroms at rated voltage to 8,500 Angstroms at twice rated voltage.

It is important that an edge nick be applied to an edge of the glass surface along the intended line of cut either immediately before or immediately after the thermal source applies the thermal score or heat path to the surface of the glass. Referring to FIG. 6, a bending moment is applied to the sheet of glass G around the heat path after the ¼ inch edge nick has been made. Snap rolls 40 as illustrated are diagrammatic, and actually any conventional snapping means may be used.

The application of the bending moment must be about the thermal score, which must pass through the edge nick for a high quality edge to result. If the edge nick is omitted or if the bending moment is not applied about the thermal score or heat path, the resulting edges may have defects such as lack of smoothness, lack of perpendicularity to the glass surfaces, lack of adequate edge strength, and lack of straightness.

In severing 5 inch trims from clear float glass, the approximate bending moments are as follows: For glass ¼ inch in thickness, a moment of 1 to 3 foot-pounds (1.36 to 4.08 joules); for glass ⅜ inch in thickness, a moment of 3 to 10 foot-pounds (4.08 to 13.6 joules); for glass ½ inch in thickness, a moment of 7 to 15 foot-pounds (9.5 to 20.4 joules); and for glass ¾ inch in thickness, a moment of 10 to 19 foot-pounds (13.6 to 25.8 joules).

The above described process has been practiced satisfactorily in cross cutting and in bisecting longitudinal cuts. When attempts were made to produce non-bisecting longitudinal cuts, the edge obtained was usually bowed or curved (hereafter referred to as "banana" edge), rather than straight. This is usually unacceptable in a commercial product. In accordance with a further embodiment of the instant invention, a straight, non-bisecting cut in a piece of glass is produced by applying a thermal source as indicated above along a straight-line locus to a piece of glass that will later be used as a template.

Figure 7:
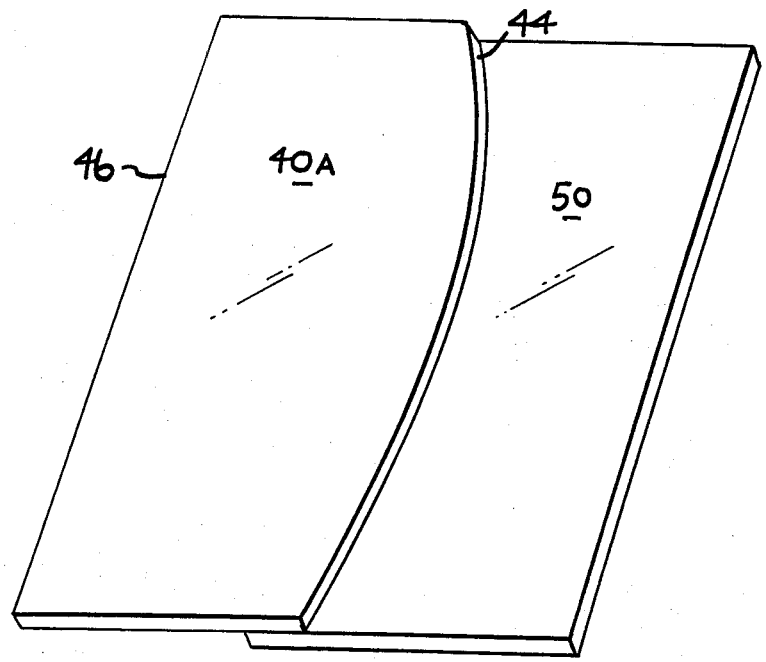
FIG. 7 is a perspective view of the piece of glass in FIG. 6 used as a template to sever a second piece of glass.

Referring to FIGS. 6–8, there is illustrated diagrammatically the steps of this further embodiment. FIG. 6 shows a piece of glass 40 that has been severed into piece 40A and trim 40B either by thermal cutting or by thermal scoring and mechanical snapping. Piece 40 was heated along an intended line of cut 42, but as pointed out above, in non-bisecting cuts, a "banana" edge 44 results. Piece 40A is then rotated about edge 46 and placed on a second piece of glass 50, as shown in FIG. 7. Piece 40A is thereby used as a template to lay out, upon the piece of glass 50, a path that is bowed toward the center of piece 50, rather than toward the edge as a normal "banana" edge. Heat is then applied to the second piece of glass 50 by either a spot-type thermal source that travels along the path defined by "banana" edge 44 or by a suitably curved line-type thermal source. A fracture-initiation score is made, and a bending moment is applied, as indicated hereinabove, when this method of making a non-bisecting cut is practiced. In effect, piece of glass 50 has been heated along a path that is opposite to the normal "banana" edge. As shown in FIG. 8, piece 50 is severed into a piece 50A and a trim 50B. In this case, however, a piece is produced having a straight edge 52, since the effect of the template with an opposite "banana" edge cancels out the would-be effect of the "banana" edge on the piece of glass 50.

It will be appreciated from the foregoing that the focus locus is not always necessarily coincident with the intended line of cut (although this is usually the case). It can be said, however, that the focus locus is always located, according to the invention, in accordance with a predetermined line of cut along which the glass is to be severed.

Either a spot-type or a line-type heater may be used, traveling in relative motion with respect to the glass. In the event that a rectilinear line-type heater is used, the relative motion is such that the projection of the heater upon the glass is substantially rectilinear.

It has also been discovered that the process described heretofore also produces edges that are smooth, straight, strong, and perpendicular to the major surfaces in low expansion glass such as that sold by PPG Industries, Inc. under the trademark "Hercuvit." This glass has a linear coefficient of thermal expansion roughly ⅓ that of plate, float or sheet glass. As a result, it appears to be extremely difficult to build up a thermal tensile stress field to a level of 1,000 pounds per square inch (725 grams per square millimeter) which is the level required to self-propagate a fracture by thermal means alone. This would seem to rule out the use of a thermal cutting process (such as the one described in my copending U.S. Application Ser. No. 66,941). However, it is possible to impress a thermal score on low expansion glass and propagate the thermal score into a fracture through the thickness of the glass by the application of a mechanical bending moment. A fracture initiation score is applied either before or after the thermal score is created and then a bending moment is applied about the thermal score. Following the above procedure yields an edge that is straight, perpendicular, smooth and extremely strong (at least about twice as strong as a wheel cut edge).

In a test conducted on production runs of "Hercuvit" glass, cross-cutting was performed on a continuous ribbon drawn along the conveyor of the annealing lehr. A fracture initiation score (½ inch long) was placed on the bulb edge. A 50 inch (127 centimeters) infrared line heater was placed on the glass directly over the desired score location. The ribbon was 45 inches (114 centimeters) wide. The heater rode atop the ribbon with the power on for 30 seconds. Immediately after the thermal score was created, a fracture was propagated across the ribbon by a slight lifting action directly under the fracture initiation score. Glass temperature at this point was approximately 500° F. Power input to the infrared line heater was approximately 234 watts per inch (9.2 watts per millimeter).

Other tests have been conducted with ribbon widths as narrow as 16 inches (40 centimeters), ribbon speeds between 49 and 115 inches per minute (124 and 292 centimeters per minute) and glass temperatures as low as 130° F. In all cases the results were good.

Whether the edge is being produced on plate glass, float glass, sheet glass, or "Hercuvit" glass, one thing must be kept in mind: The bending moment must be applied promptly after thermal score is created. To understand this, one must realize what the thermal source is doing to the physical properties of the glass. Glass can be severed by either melting the glass or by creating a tensional stress above 1,000 pounds per square inch (725 grams per square millimeter). When glass is in an equilibrium state, its surfaces are in compression and its center is in tension. As the thermal source applies heat to the focus locus, the expansion of the glass causes the surface compression to be reduced and the internal tension to be increased. If the tensional stresses are allowed to reach 1,000 pounds per square inch (725 grams per square millimeter), a thermal cut will result as described in my copending U.S. Application Ser. No. 66,941. But if one merely heats the glass so that the tensional stresses are increased (but not to the 1,000 pounds per square inch limit), then a bending moment applied along the path of increased tensional stress (the thermal score) will sever the glass along this path. If one heats the glass and then allows it to stand without promptly applying a bending moment, the tensional stresses that have been created will be relieved and the glass will be returned to its normal state. Therefore, one must apply the bending moment before any long period of time has elapsed to take advantage of the increased tensional stresses.

It cannot be stated with precision how quickly the operator must act to apply a bending moment. The allowable time will depend on the length of the sheet of glass, the composition of the glass and the amount of heating time. Somewhere between 10 and 15 seconds between the finish of the creation of the thermal score and the application of the bending moment is usually sufficient.

I claim as my invention:

1. A method of cutting a piece of glass along an intended line of cut comprising the steps of:
   providing a source of thermal energy adjacent the intended line of cut,
   positioning with respect to said glass and said source a reflector to focus infrared radiation from said source to a surface on said glass,
   activating said source to create a thermal score on the surface of said glass, and
   applying a bending moment about the thermal score to sever said piece.

2. A method as defined in claim 1 wherein an edge nick is applied to the glass at the intended line of cut.

3. A method as defined in claim 2 wherein the edge nick is applied before said source is activated.

4. A method as defined in claim 2 wherein the edge nick is applied after said source is activated.

5. A method of cutting a piece of glass along an intended line of cut comprising the steps of:
   positioning with respect to said glass an elliptical reflector means having a first focus and a second focus spaced from said first focus,
   providing a source of thermal energy at said first focus,
   activating said source of thermal energy to cause the production of infrared radiation which is focused into a locus at said second focus by said elliptical reflector, said locus being coincident with a surface of said piece of glass, applying a bending moment about a thermal score that has been created in said glass by said source of thermal energy and said reflector.

6. A method as defined in claim 5 wherein said source of thermal energy has a maximum dimension in a direction transverse to the intended line of cut of ¼ inch.

7. A method as defined in claim 5 wherein said source of thermal energy emits radiation having a wave length of 8,500 to 11,500 Angstroms.

8. A method as defined in claim 5 wherein said piece of glass is at least ¼ inch thick.

9. A method as defined in claim 5 wherein said source of thermal energy comprises a line-type heater comprising a coil of tungsten wire, said coil being about 0.06 inch in diameter and the wire of said coil having a diameter of about 0.006 inch, said wire being enveloped in inert gas and provided with electric power.

10. A method as defined in claim 5 wherein said source of thermal energy comprises a spot-type heater, said method being conducted by causing said spot-type heater to be brought into relative motion with respect to said piece of glass to be cut while spaced at a uniform distance therefrom.

11. A method as defined in claim 5 wherein said source of thermal energy comprises a line-type heater, said method being conducted by causing said line-type heater to be brought into relative motion with respect to said piece of glass to be cut while spaced at a uniform distance therefrom, said relative motion being such that the projection of said line-type heater upon said glass is substantially rectilinear.

12. A method as defined in claim 5 wherein an edge nick is applied to the glass at the intended line of cut.

13. A method as defined in claim 12 wherein the edge nick is applied before said source is activated.

14. A method as defined in claim 12 wherein the edge nick is applied after said source is activated.

15. A method of severing a first piece of glass along a straight line of predetermined location, said method comprising the steps of:
applying to a second piece of glass congruent to said first piece of glass a thermal source along a straight line having a location corresponding to said straight line of predetermined location, whereby there is produced in said second piece of glass a thermal fracture following a curved line,
applying to said first piece of glass thermal energy along a curved line congruent to said curved line, whereby said first piece of glass is thermally scored along said straight line of predetermined location, and
applying a bending moment about said straight line.

16. A method of cutting a piece of glass as defined in claim 5, wherein said reflector is positioned with respect to glass containing at least one of the transition elements.

17. A method of cutting a piece of glass as defined in claim 5, wherein said reflector is positioned with respect to glass having at least about 0.09 percent $Fe_2O_3$.

18. A method of cutting a piece of glass as defined in claim 5, wherein said reflector is positioned with respect to glass having a low coefficient of thermal expansion.

19. A method of cutting a piece of glass along an intended line of cut comprising the steps of:
providing a source of radiant thermal energy adjacent to a surface of said piece of glass,
activating said source while concentrating said energy to create a thermal score having a maximum width of approximately 0.25 inch along the intended line of cut whereby said source does not place a groove in the glass surface along the intended line of cut, and
applying a bending moment about the thermal score to sever said piece.

20. An apparatus for cutting a piece of glass along an intended line of cut comprising:
a source of thermal energy spaced from the intended line of cut,
means for focusing thermal energy from said source to a surface on said piece to create a thermal score along the intended line of cut whereby said source does not place a groove in the glass surface along the intended line of cut, and
means for applying a bending moment about the thermal score to sever said piece.

21. An apparatus as recited in claim 20, wherein said source supplies infrared radiation.

22. An apparatus as recited in claim 21, wherein said means for focusing comprises a reflector.

23. An apparatus as recited in claim 22, wherein said reflector is elliptical.

24. A method of cutting a piece of glass along an intended line of cut comprising the steps of:
providing a source of thermal energy adjacent to the intended line of cut,
positioning with respect to said glass and said source a reflector to focus infrared radiation from said source to a surface on said glass,
activating said source to create a heat path through the thickness of the glass along the intended line of cut to increase tensile stresses in the glass without placing a groove in the glass surface along the intended line of cut, and
applying a bending moment about the heat path to sever said piece.

25. A method as defined in claim 24, wherein an edge nick is applied to the glass at the intended line of cut.

26. A method of cutting a piece of glass along an intended line of cut comprising the steps of:
positioning with respect to said glass an elliptical reflector means having a first focus and a second focus spaced from said first focus,
providing a source of thermal energy at said first focus,
activating said source of thermal energy to cause the production of infrared radiation which is focused into a locus at said second focus by said elliptical reflector, said locus being coincident with the surface of said piece of glass so that said source creates tensile stresses within said glass without placing a groove in the glass surface along the intended line of cut, and
applying a bending moment about a heat path that has been created in said glass by said source of thermal energy and said reflector.

27. A method as defined in claim 26, wherein an edge nick is applied to the glass at the intended line of cut.

* * * * *